United States Patent [19]

Collard

[11] Patent Number: 4,868,772
[45] Date of Patent: Sep. 19, 1989

[54] EARNED RUN AND BATTING AVERAGE CALCULATOR

[76] Inventor: Thomas H. Collard, 15420 Olde Highway 80, Space 106, El Cajon, Calif. 92021

[21] Appl. No.: 182,438

[22] Filed: Apr. 18, 1988

[51] Int. Cl.⁴ .......................................... G06F 15/02
[52] U.S. Cl. .............. 364/709.01; 364/411; 364/734
[58] Field of Search ............ 364/709.01, 734, 410, 364/411; 340/323 R

[56] References Cited

U.S. PATENT DOCUMENTS

| 4,048,484 | 9/1977 | Brittan | 364/734 X |
| 4,118,783 | 10/1978 | Collins | 364/734 |
| 4,142,236 | 2/1979 | Martz | 364/411 |
| 4,266,214 | 5/1981 | Peters, Jr. | 340/323 R |
| 4,282,580 | 8/1981 | McGuire et al. | 364/734 |
| 4,367,526 | 1/1983 | McGeary et al. | 364/411 |
| 4,715,011 | 12/1987 | Brittan | 364/734 |

Primary Examiner—Gary V. Harkcom
Assistant Examiner—Tan V. Mai
Attorney, Agent, or Firm—Frank D. Gilliam

[57] ABSTRACT

A hand held calculator for quickly calculating the earned run average of a baseball pitcher or the batting average of a baseball player. The calculator employs a data input key board with whole number keys, fraction keys, function keys such as those required to perform mathematical functions and special function keys dedicated to the calculation of earned run and batting averages. The data input key board is interconnected to a visual display, in one embodiment a dedicated times 9 circuit and an arithmetic logic unit (ALU). The keys of the data input key board include indicia indicating their function.

8 Claims, 2 Drawing Sheets

EARNED RUN AND BATTING AVERAGE CALCULATOR

BACKGROUND OF THE INVENTION

The invention is directed to hand held calculators, and more particularly to hand held calculators which have a dedicated function and specifically to a hand held calculator for determining the earned run or batting average of a baseball player Dedicated calculators include the teachings of U.S. Pat. Nos. 4,048,484, 4,118,783 and 4,282,580 for grade averaging that includes data input keys for entering letter grades and determining an average letter grade therefrom and U.S. Pat. Nos. 4,142,236 and 4,367,526 for hand calculators for determining golf scores.

These calculators generally have dedicated keys to make their performance for specific calculations by a lay operator simple and accurate.

There is no known dedicated calculator for the purpose for which the instant invention is dedicated. Due to the popularity of baseball by players at all ability levels of play and spectators there is a long standing need for a simple means and method for instantly determining the earned run average and/or batting average of a specific player without knowing the mathematical equation required for such a calculation. The instant invention will satisfy that long standing need.

SUMMARY OF THE INVENTION

The invention is directed to an easily operated hand held calculator for determining a base ball pitcher's career, season, or game earned run average or a baseball player's career, season, or game batting average. Data input keys of the calculator include keys for entering numerical data associated with total runs given up to date, total innings pitched, total hits to date, total times at bat and for any other normal mathematical functions not associated with the specific dedicated functions of the calculator of the invention. The key board further includes keys for entering specific functions such as, ER for entry of earned runs given up to date, IP for total innings pitched to date, ERA for entry of earned run average H for entry of total hits to date, AB for entry of total times at bat to date, BA for entry of batting average to date and fraction keys for partial innings played. The normal =, ·, +, − and C for clear screen.

In a first preferred embodiment, the data input key board is interconnected to a digital display, a display driver and an ALU (arithmetic logic unit). For use as a simple mathematical calculator the normal expected operations are preformed. For use in the earned run average (ERA) function, the calculator is energized by a switch, the numerals indicating the total runs given up by a particular pitcher to date are entered via the numerical data input keys, the ER (earned run) key is then depressed which provides a divide function, the numbers representing the total innings pitched by that pitcher to date are then entered via the data input keys, the IP (innings pitched) key which provides a × (times) function is then depressed, the ERA (earned run average) key is then depressed. The numerical total earned run average for the pitcher is then displayed on the digital display. In effect the ER key is a divide function key, the IP key is a times 9 multiplication key and the ERA key is an equal key. The resulting function is the equivalent to the equation $ERA = (EP)/(IP) \times 9$.

For use in the batting average (BA) function, the calculator is energized by the switch, the numerals indicating the batting average of a player to date are entered via the numerical data input keys, the H key (hits) is then depressed which provides a divide function, the numbers representing the total times at bat to date are then entered via the data input keys, the AB (at bat) key is then depressed, this key is a blank key and performs no actual function and the BA (batting average) key is then depressed, this key performs the = function. The batting average is then read from the visual display.

In the second embodiment, the calculator function similar to the first embodiment with the exception of the absence of the ×9 circuit which requires that the operator manually perform the × and 9 functions separately. For use as a simple mathematical calculator the normal expected operations are performed. For use in the earned run average (ERA) function, the calculator is energized by the switch, the numerals indicating the total runs given up by a particular pitcher to date are entered via the numeral data input keys, the ER key is then depressed which provides a divide function, the numbers representing the total innings pitched to date are then entered via the data input keys, the IP key is then depressed which is an × (times) function, the ERA key is then depressed which provides a 9 function and then the = key is depressed to provide the earned run average on the display.

In a second embodiment, the use of the calculator of the invention for the batting average (BA) function, the calculator is energized, the numeral indicating the total hits to date are entered via the appropriately numbered keys, the H (hits) key is then depressed, the numerical number for the total times at bat to date is then entered via the appropriated numeral keys, the AB (at bat) key is then depressed, the BA (batting average) key is then depressed and the = key is then depressed to display the batting average (BA). The resulting function is the equivalent to the equation $BA = H/(AB)$. The AB and BA keys are not connected to the circuitry of the calculator of the invention but are merely used in the calculation so as to generally follow the same number of operations and operation logic as the ER calculation explained above.

In the first embodiment of the calculator of the invention, a dedicated times 9 (×9) circuit is interconnected to the key board, display and ALU so that when calculating ERA depressing the IP key functions as a times 9 key thereby eliminating one of the key functions required to arrive at the same result using the device according to the second embodiment. When calculating the BA using the first embodiment, the BA key is no longer a "blank" or no function key and operates as the = key again deleting one operation required to reach the same result using the second embodiment.

An object of this invention is to provide a hand held calculator to calculate either the earned run average or batting average of a particular baseball player easily and quickly by knowing certain specifics of the playing record of that particular player.

An object of the invention is to mark the keys of a hand held calculator in a manner so that specific desired results are achieved without knowledge of mathematical formulas relating thereto.

Another object of this invention is to minimize calculations provided by the calculator of the invention.

Another object of this invention is to provide a hand held calculator with keys logically identified with letter abbreviations for certain specific numerical inputs required to perform the calculations.

These and other objects of the invention will become apparent from the following description when taken together with the accompanying drawing Figures.

BRIEF DESCRIPTION OF THE DRAWING FIGURES

DETAILED DESCRIPTION OF THE PREFERRED EMBODIMENTS

Figures 1, 3:
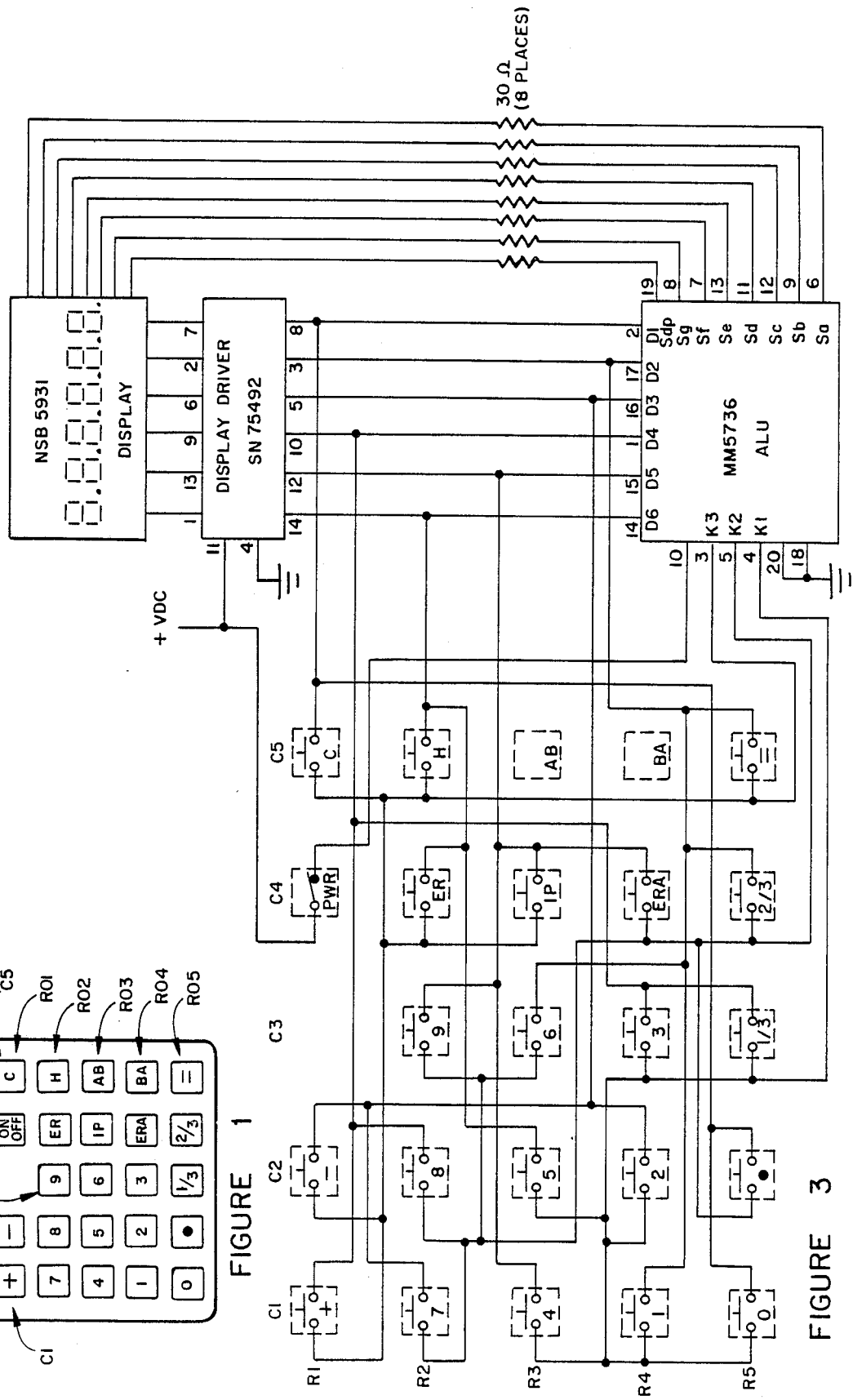
FIG. 1 is a plan viewing showing the indicia on the data input key board as well as the digital display.
FIG. 3 is a schematic wiring diagram of a second embodiment of the instant invention.

Referring to the drawing FIGURES and specifically to FIG. 1, a plan view of the hand held calculator 10 of the invention is shown. A digital readout or visual indicator 12 is shown located at the top of the drawing. The digital readout contains six digits one of which is used as a floating decimal point. More or less digits could be utilized to practice the invention depending on the expected accuracy of the resulting calculations. Twenty four data input keys are shown positioned in columns extending from the top to the bottom and rows across from side to side of the drawing. The function of each key is marked on the upper surface as for example the key on the top of column 1 is a +input key and on the bottom of column 1 is a 0 input key. There are five columns of keys from the left hand side of the drawing to the right hand side. There are five rows of keys from row 1 having only four keys with the + input key on the left hand side thereof and the C input key on the right hand end of the row. There are five rows from the top to the bottom of the key board of the calculator 10.

Figure 2:
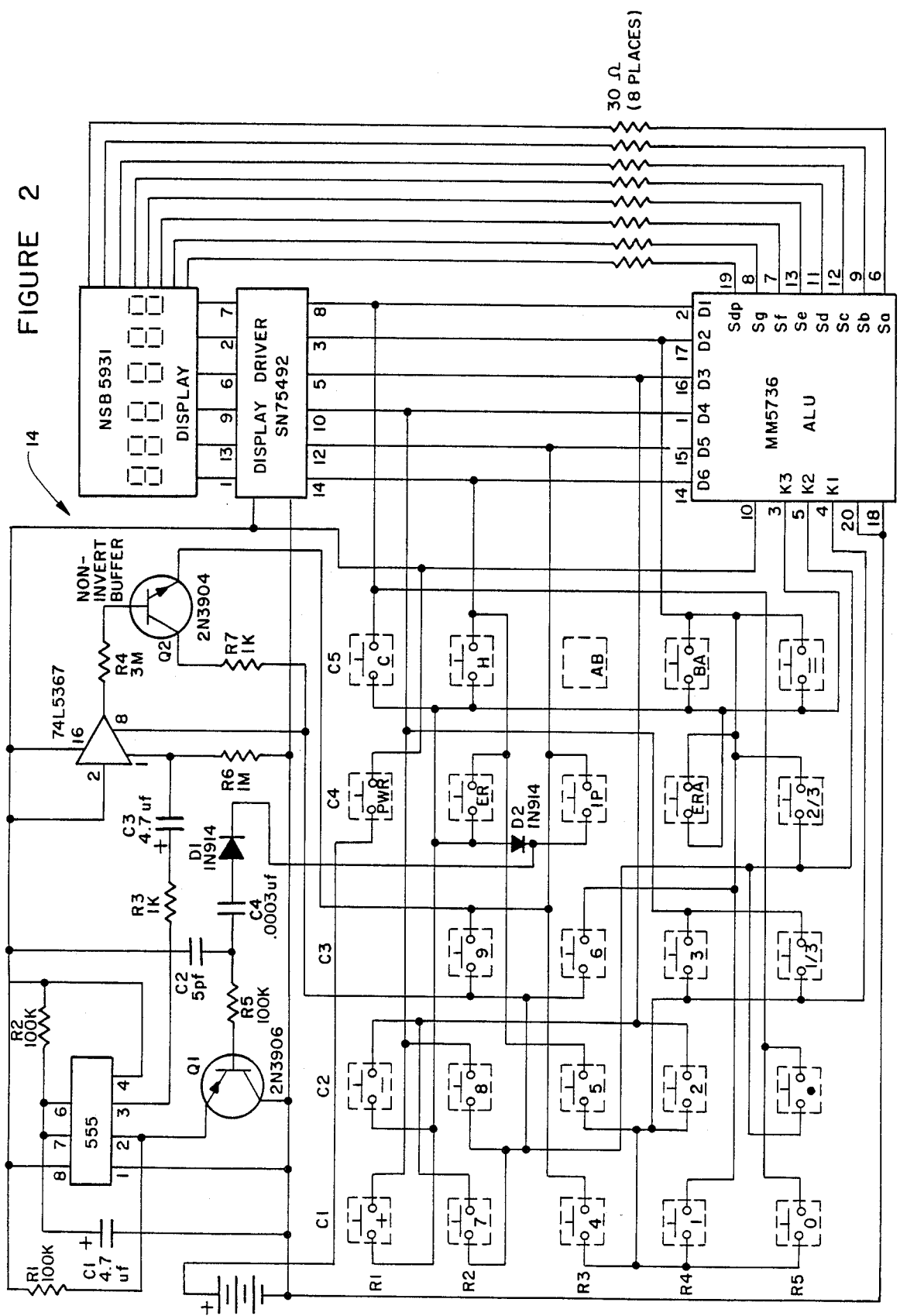
FIG. 2 is a schematic wiring diagram of a first embodiment of the instant invention.

Referring now specifically to drawing FIG. 2 which depicts the schematic diagram of the electronic wiring and components of the first preferred embodiment of the invention. The differences in the wiring of the second embodiment will be herein after discussed. Rows R1–R2 and C1–C5 of function data input keys are shown on FIG. 1 and the right hand side of the drawing FIG. 2 which has the same positional layout as the same function data input keys as shown in FIG. 1.

Positioned immediately above the rows and columns of the data input keys is a times 9 circuit 14 which comprises a timer element IC 555 or equivalent. Terminals 6 and 7 of the timer element are connected through a capacitor C1 of 4.7 micro farads to common ground potential and to a DC power source through a resistor R2 of 100K ohms. The power source is typically 6 volts DC, but could have any convenient value between 1.5 and 9 volts. Terminal 1 of timer element IC 555 is connected directly to ground potential. Terminals 4 and 8 are connected directly to the DC power source. Terminal 2 is connected to the DC power source through R1 of 100K ohms and to the emitter of a transistor Q1 of the type 2N3906 or equivalent. Terminal 1 is connected to ground potential. Terminal 3 is connected to one side of resister R3 of 1 K ohm.

The base of transistor Q1 is connected to one side of a resistor R5 of 100K ohms. The emitter of transistor Q1 is tied to ground potential. The opposite side of R3 is connected to the connection of an electrolytic capacitor C3 of 4.7 micro farads. The opposite side of R5 is connected to a capacitor C2 of 5 picofarads and to one side of C4 of 0.0003 micro farads. The opposite side of C2 is connected to the DC power supply. The other side of C4 is connected to the anode of a diode D1. The opposite side of capacitor C3 is connected to terminal 1 of a non-inverting buffer of the type 74LS36T or equivalent thereto.

Terminals 2 and 16 of the non-inverting buffer are connected to the DC power. Terminal 8 of the non-inverting buffer is connected to ground potential. Terminal 3 of the non-inverting buffer is connected to one side of resistor R4 of 3 meg ohms. The opposite side of R4 is connected to the base of a transistor Q2 of the type 2N3904 or equivalent.

The collector of transistor Q2 is connected through a resistor R7 of 1K ohm to one terminal of the keys for inputting the digits 6–9, the multiplication function, two thirds numeral and terminal 4 of an ALU of the type MM5736 or equivalent. The emitter of transistor Q2 is connected to the opposite terminal of the key for inputting the numeral 9, to one terminal of the keys for inputting the numeral 4, IP, terminal 14 of the ALU and to terminal 14 of a display driver of the type SN75492 or equivalent.

Terminals of the ALU and display driver are interconnected in the following manner terminals 14, 12, 10, 5, 3 and 8 are of the display driver are connected respectfully to terminals 14, 15, 1, 16, 17 and 2 of the ALU. The output terminals 1, 13, 9, 6, 2 and 7 are connected respectfully to the segments of the digital visual indicator 12 from left to right in the FIGURE. Terminals 19, 8, 7, 13, 11, 12, 9 and 6 are connected to the appropriate connection of the visual display each through a 30 ohm resistor as referenced in the manufactures specifications to accomplish the desired visual display when depressing the data input keys.

The other connections of the data input keys to the ALU and display driver are in accordance with known principles as shown in the last mentioned drawing Figure.

Referring again to the ×9 circuit, the cathode of diode D1 is connected to the cathode of a diode D2 and to one connection to the data input key IP. The anode of the diode D2 is connected to on connection of the data input key ER. The remaining connections of the various data input keys are connected as shown in FIG. 2. It should be noted that in the first embodiment as shown in FIG. 2, the AB data input key is a dummy key and has no electrical connection to the rest of the electrical circuit

OPERATION OF THE FIRST PREFERRED EMBODIMENT

For example to calculate the earned run average (ERA) of complete games pitched, the user turns the device "on" by switching the switch S1 from it normally open position shown in FIG. 2 to a closed position (not shown) whereby the calculator is energized. For example to calculate the earned run average of a pitcher who has given up 58 runs and pitched 240 innings to date, the total earned run average is then calculated in the following steps:

EARNED RUN AVERAGE

Operation Sequence: Example—58 ER, 240 IP. Answer: 2.175 ERA (1) Enter: Number of earned runs to date. 58

(2) Press: [ER] key.
(÷) function (3) Enter: Number of innings pitched to date. 240

(4) Press: [IP] key
(×9) function (5) Press: [ERA] key and display will show Earned Run Average. 2.175
(=) function The device is capable of including fractions of innings of a particular pitcher by the use of special keys indicating one third or two thirds. For example:

If innings pitched to date include either ⅓ or ⅔ of an inning, then Operation Sequence: Example—58 ER, 240⅓ Ip. Answer: 2.172 ERA (1) Enter: Number of earned runs to date. 58

(2) Press: [ER] key.
(÷) function (3) Enter: Number of innings pitched to date. 240

(4) Press: [ . ] key.
(.) function (5) Press: [1/3] key.
(3) function (6) Press: [IP] key.
(×9) function (7) Press: [ERA] key and display will show Earned Run Average. 2.172
(=) function Example—58 ER, 240⅔ IP. Answer 2.169 ERA Operation Sequence is:

(1) Enter: Number of earned runs to date. 58

(2) Press: [ER] key.
(÷) function (3) Enter: Number of innings pitched to date. 240

(4) Press: [ . ] key.
(.) function (5) Press: [2/3] key.
(6) function (6) Press: [IP] key.
(×9) function (7) Press: [ERA] key and display will show Earned Run Average. 2.169
(=) function

BATTING AVERAGE

Operation Sequence: Example—167 H, 452 AB. Answer: 0.369 BA (1) Enter: Number of hits to date. 167

(2) Press: [H] key.
(÷) function (3) Enter: Number of times at bat to date. 452

(4) Press: [AB] key.
blank (5) Press: [BA] key and display will show Batting Average. .369
(=) function

DESCRIPTION AND OPERATION OF THE SECOND PREFERRED EMBODIMENT

The second preferred embodiment is similar to the first preferred embodiment except that the dedicated ×9 circuit is eliminated, the diode D2 is removed, the out put terminal of the power switch S1 is connected directly to terminal 11 of the display driver and the input data key BA like AB has no connection to the calculator circuit. The calculations equivalent to those above are as follows:

EARNED RUN AVERAGE

Operation Sequence: Example—58 ER, 240 IP. Answer: 2.175 ERA (1) Enter: Number of earned runs to date. 58

(2) Press: [ER] key.
(÷) function (3) Enter: Number of innings pitched to date. 240

(4) Press: [IP] key.
(×) function (5) Press: [ERA] key.
(9) function

-continued

| | | |
|---|---|---|
| (6) Press: | [ = ] | key and display will show Earned Run Average. 2.175 |
| | (=) function | |

If innings pitched to date include either ⅓ or ⅔ of an inning, then—

Operation Sequence is: Example—58 ER, 240⅓ IP. Answer 2.172 ERA

| | | |
|---|---|---|
| (1) Enter: | Number of earned runs to date. 58 | |
| (2) Press: | [ ER ] | key. |
| | (÷) function | |
| (3) Enter: | Number of innings pitched to date. 240 | |
| (4) Press: | [ . ] | key. |
| | (.) function | |
| (5) Press: | [ 1/3 ] | key. |
| | (3) function | |
| (6) Press: | [ IP ] | key. |
| | (×) function | |
| (7) Press: | [ ERA ] | key. |
| | (9) function | |
| (8) Press: | [ = ] | key and display will show Earned Run Average. 2.172 |
| | (=) function | |

Operation Sequence Example—58 ER, 240⅔ IP. Answer: 2.169 ERA.

| | | |
|---|---|---|
| (1) Enter: | Number of earned runs to date. 58 | |
| (2) Press: | [ ER ] | key. |
| | (÷) function | |
| (3) Enter: | Number of innings pitched to date. 240 | |
| (4) Press: | [ . ] | key. |
| | (.) function | |
| (5) Press: | [ 2/3 ] | key. |
| | (6) function | |
| (6) Press: | [ IP ] | key. |
| | (×9) function | |
| (7) Press: | [ ERA ] | key and display will show Earned Run Average. 2.169 |
| | (=) function | |

BATTING AVERAGE Operation Sequence:
Example—167 H, 452 AB. Answer: 0.369 BA

| | | |
|---|---|---|
| (1) Enter: | Number of hits of date. 167 | |
| (2) Press: | [ H ] | key. |
| | (÷) function | |
| (3) Enter: | Number of times at bat to date. 452 | |
| (4) Press: | [ AB ] | key. |
| | blank | |
| (5) Press: | [ BA ] | key. |
| | blank | |
| (6) Press: | [ ERA ] | key and display will show Batting Average. .369 |
| | (=) function | |

Although preferred embodiments of the invention have been illustrated in the accompanying FIGURES and described in the foregoing detailed description, it will be understood that the invention is not limited to the embodiments discussed, but is intended to embrace any alternatives, modifications, and limitations or substitutions of parts or elements as fall within the spirit and scope of the invention.

What is claimed is:

1. A hand held calculator for computing the earned run average of a baseball pitcher or the batting average if a baseball player comprising:
   an arithmetic logic unit having an input and an output;
   a display driver having an input and output, said input connected to said arithmetic logic unit;
   a display having an input interconnected to said output of said display driver and the output of said arithemtic logic unit; and
   a plurality of depressible data input keys each having an output, the output of said data input keys except one thereof being connected to the output of said arithmetic logic unit and to the input of said display driver, one of said data input keys with AB thereon has no function, two of said plurality of data input keys have the indicia ⅓ and ⅔ thereon, two of said plurality of data input keys provide mathematical division functions when depressed, one of said plurality of data input keys providing a mathematical division function when depressed, one of said plurality of data input keys providing a mathematical multiplication function has the indicia IP thereon, two of said plurality of input data keys provide equal functions, one of said equal functions function keys having the indica ERA thereon, two of said plurality of data input keys represent the numeral 9, one of said plurality of data input keys representing the numeral 9 has the indicia ERA thereon, other of said plurality of data input keys provide at least the numerals 0 through 9 when depressed, whereby when an earn run average is being calculated the following data input key depressing sequence is performed, the numerical data input keys representing the total earned run average of a specific pitcher to date are depressed, said ER input data key is depressed, the data input keys representing the total innings played by said specific pitcher are depressed, said IP data input key is depressed, the numeral 9 key is depressed and the equal input data key is depressed and when a player's batting average is being calculated the following sequence is preformed, data input keys representing the total number of hits of a specific player are depressed, the input data function key is depressed, the data input keys indicating the total times at bat are depressed, the AB data input key is depressed and the equal function key is depressed.

2. The calculator as defined in claim 1 wherein said arithmetical logic unit is a type MM5736 module.

3. The calculator as defined in claim 1 wherein said display is a type NSB5931 module having six digits with one of said digits being a decimal point.

4. The calculator as defined in claim 1 wherein said display driver is a type SN75472 module.

5. The calculator as defined in claim 1 including an additional circuit for providing a times 9 function when the IP input data key is depressed.

6. The calculator as defined in claim 1 wherein a third key with BA thereon performs the equal function.

7. The calculator as defined in claim 1 wherein said AB key has no connection to said arithmetic logic unit or to said display drive.

8. The calculator is defined in claim 1 additionally including a BA key which has no connection to said arithmetic logic unit or to said display driver.

* * * * *